under 35 U.S.C. 154(b) by 142 days.

United States Patent
Mao et al.

(10) Patent No.: US 12,149,101 B2
(45) Date of Patent: Nov. 19, 2024

(54) CLOSED LOOP POWER LOSS CONTROL OF WIRELESS POWER TRANSMISSION, AND METHODS FOR WIRELESS POWER TRANSMISSION

(71) Applicant: NXP USA, Inc., Austin, TX (US)

(72) Inventors: Huan Mao, Suzhou (CN); Dechang Wang, Suzhou (CN); Li Wang, Suzhou (CN)

(73) Assignee: NXP USA, Inc., Austin, TX (US)

( * ) Notice: Subject to any disclaimer, the term of this patent is extended or adjusted under 35 U.S.C. 154(b) by 142 days.

(21) Appl. No.: 17/816,476

(22) Filed: Aug. 1, 2022

(65) Prior Publication Data

US 2024/0014691 A1 Jan. 11, 2024

(30) Foreign Application Priority Data

Jul. 5, 2022 (CN) .......................... 202210796771.0

(51) Int. Cl.
*H02J 50/80* (2016.01)
*H02J 50/10* (2016.01)
*H04B 5/79* (2024.01)

(52) U.S. Cl.
CPC .............. *H02J 50/80* (2016.02); *H02J 50/10* (2016.02); *H04B 5/79* (2024.01)

(58) Field of Classification Search
CPC .............. H02J 50/10; H02J 50/80; H04B 5/79
See application file for complete search history.

(56) References Cited

U.S. PATENT DOCUMENTS

| | | | |
|---|---|---|---|
| 2014/0084858 A1* | 3/2014 | Kim | H02J 50/12 320/108 |
| 2014/0232199 A1 | 8/2014 | Jung et al. | |
| 2019/0068004 A1* | 2/2019 | Louis | H02J 50/12 |
| 2021/0036550 A1* | 2/2021 | Ha | H02J 7/02 |

OTHER PUBLICATIONS

Jafari et al., "A novel technique for discrimination of Foreign Object from misalignment in Wireless Charging Systems," 2019 IEEE Transportation Electrification Conference and Expo (ITEC), Jun. 19-21, 2019, 6 pages.
Huang et al., "Enhancement of Wireless Power Transmission with Foreign-Object Detection Considerations", 2017 IEEE 6th Global Conference on Consumer Electronics (GCCE 2017), Oct. 24-27, 2017, 2 pages.

* cited by examiner

Primary Examiner — Jeffrey M Shin

(57) ABSTRACT

Power transmission associated with wireless charging of a battery of an electronic device or powering of the electronic device comprises determining a power loss associated with transmitting a power signal having a transmitted power from the wireless power transmitter to a wireless power receiver. A closed loop power loss control based on the power loss is performed which comprises outputting a target transmit power to meet a power loss limit. The power signal having the target transmit power is wirelessly transmitted to the wireless power receiver to charge the battery of the electronic device or power the electronic device and balance charging performance and safety.

16 Claims, 6 Drawing Sheets

CLOSED LOOP POWER LOSS CONTROL OF WIRELESS POWER TRANSMISSION, AND METHODS FOR WIRELESS POWER TRANSMISSION

FIELD OF USE

This disclosure generally relates to wireless power transmission, and more particularly to closed loop power loss control of wireless power transmission from a wireless power transmitter to a wireless power receiver to charge or power an electronic device coupled to the wireless power receiver.

BACKGROUND

A wireless power transmitter has one or more transmitter coils located on a plane of a charging surface. To charge or power an electronic device, a wireless power receiver coupled to the electronic device is placed on the charging surface. A voltage or current applied to the transmitter coil causes the transmitter coil to transmit a power signal in the form of a magnetic flux which couples with a receiver coil of the wireless power receiver to transmit power to charge or operate the electronic device.

In some examples, a foreign object is located on the charging surface. The foreign object (FO) is a metal object such as a key, paper clip, or pen which is positioned in between the transmitter coil and receiver coil on the charging surface. Alternatively, the foreign object is a component of the wireless receiver such as a metal frame around the wireless receiver, referred to a friendly foreign object (FO). The power signal transmitted by the wireless power transmitter affects the FO. In particular, the power signal generates eddy currents in the FO and heating of the FO. To avoid damage to the charging surface, the wireless power receiver, or the foreign object by the heating, the wireless power transmitter stops transmitting the power signal and as a result the electronic device is no longer charged or powered.

Figure 1:
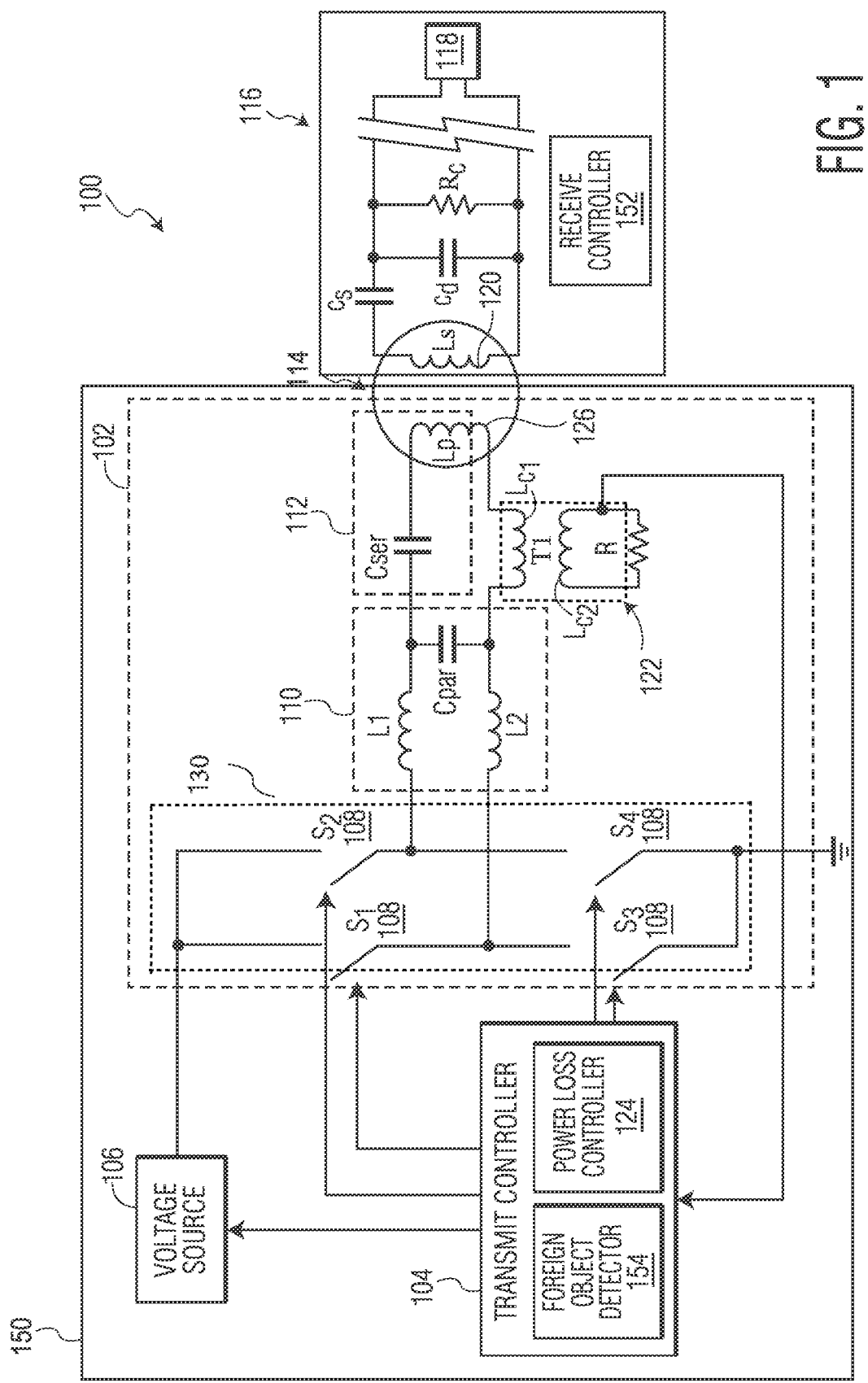
FIG. 1 is a block diagram of an example wireless power transmission system in accordance with an exemplary embodiment.

The drawings are for the purpose of illustrating example embodiments, but it is understood that the embodiments are not limited to the arrangements and instrumentality shown in the drawings.

DETAILED DESCRIPTION

The description that follows includes example systems, methods, techniques, and program flows associated with closed loop power loss control of wireless power transmission.

Overview

A wireless power transmitter detects presence of a foreign object (FO) and stops transmission of a power signal from the wireless power transmitter to a wireless power receiver to avoid heating of the foreign object by measuring a power loss. The power loss is a difference between an amount of power that the wireless power transmitter transmits by the power signal and an amount of power that the wireless power receiver receives to power an electronic device or charge a battery of the electronic device. A foreign object detector of the wireless power transmitter then monitors the power loss and compares the power loss to a FO detection (FOD) threshold level. If the power loss associated with the wireless power transmission exceeds the FOD threshold level, then the wireless power transmitter stops transmitting the power signal. If the power loss associated with the wireless power transmission does not exceed the FOD threshold level, then the wireless power transmitter continues to transmit the power signal.

In some examples, the foreign object detector affects charging performance. For example, if the FO is a friendly FO, a certain power loss results in triggering the FOD threshold level. Because a larger portion of the power loss is due to misalignment of a receiver coil and a transmitter coil on a charging surface, the FOD threshold level associated with the foreign object detector is increased so that the power signal is transmitted in presence of higher power loss to improve charging or increase active charging area. But this increase in the FOD threshold level has a negative effect if the FO is not a friendly FO. The increase in the FOD threshold level might result in an excessive heating of the FO because the wireless power transmitter does not distinguish whether or not the FO is a friendly FO.

Embodiments disclosed herein are directed to the wireless power transmitter controlling the power loss by a closed loop power loss control instead of the foreign object detector only comparing the power loss to a threshold level and stopping transmission of the power signal when the power loss exceeds the threshold level. The closed loop power loss control adjusts the transmitted power dynamically based on a control loop such as a proportional integral (PI) control, proportional integral derivative (PID) control, or proportional control to regulate, power loss in an acceptable range by keeping the power loss below the threshold level so that transmission of the power signal is not terminated and resulting heating of the FO is kept in an acceptable range. The use of the closed loop power loss control balances charging performance with safety associated with wireless charging in presence of FO which include a friendly FO. Well known instructions, protocols, structures, and techniques have not been shown in detail in order not to obfuscate the description.

Example Systems

FIG. 1 is a block diagram of an example wireless power transmission system 100 in accordance with an exemplary embodiment. The wireless power transmission system 100 may include a wireless power transmitter 150 and a wireless power receiver 116 coupled to an electronic device 118 such as a handheld wireless phone, a wearable device (e.g., watch, glasses, fitness tracker, sleeping monitor), or other type of electronic device. In some examples, the electronic device 118 and the wireless power receiver 116 may be an integrated device. The wireless power transmitter 150, the wireless power receiver 116, and the electronic device 118 may be each implemented using circuitry such as one or more of analog circuitry, mix signal circuitry, memory circuitry, logic circuitry, and processing circuitry that executes code stored in a memory that when executed by the processing circuitry performs the disclosed functions, among other implementations.

The wireless power transmitter 150 may include a power circuit 102, a transmit controller 104, and a voltage source 106, among other components. The power circuit 102 may transmit a power signal. In an example, the power circuit 102 may include an inverter 130 having one or more switches 108, a filter circuit 110, and a resonance circuit 112. The inverter 130 may include two switches as half bridge (not shown) or four switches 108 S1-S4 as full bridge (as shown). The voltage source 106 may generate a DC voltage to drive the one or more switches 108. In an example, the voltage source 106 may be a DC/DC converter. The switches 108 may take the form of transistors such as gallium-nitride field effect transistors or MOSFET transistors and be arranged in a full bridge configuration as shown or a half bridge configuration in other arrangements. The switches 108 labeled as S1, S2 may be coupled to the voltage source 106 and the switches 108 labeled as S3, S4 may be coupled to ground in an example. The switches S1, S2 are further coupled to the filter circuit 110. In an example, the filter circuit 110 may be a "pi" filter as known by one skilled in the art and includes inductors L1, L2 and a parallel capacitance Cpar to filter out higher order harmonics resulting from the switching. The resonance circuit 112 may have an inductor Lp in the form of a transmitter coil 126 and a capacitor Cser to generate a coil current at an operating frequency of the wireless power transmitter 150. The transmitter coil 126 may be located on a charging surface 114 such that current flowing through the transmitter coil 126 or voltage applied across the transmitter coil 126 causes the transmitter coil 126 to transmit a power signal. The charging surface 114 may be a planar pad on which the wireless power receiver 116 may be placed to charge a battery (not shown) of the electronic device 118 or to power the electronic device 118 and the transmitter coil 126 may be arranged as a planar coil on the charging surface 114 in an example. In some examples, the wireless power transmitter 150 might not have the filter circuit 110 and the inverter 130 may be coupled directly to the resonance circuit 112.

The power circuit 102 may be coupled to the transmit controller 104 which has a plurality of outputs each providing a signal to open or close one or more of the switches 108. The signals may be pulse width modulated signals (PWM) with a duty cycle such as a 50% constant duty cycle and causes the switches 108 to open or close in accordance with the duty cycle. The switching may have an operating frequency of 127.7 kHz which is a typical for the wireless power transmitter 150. Further, in an example, the PWM signals applied to the switches S1, S2 may be complementary to the PWM signals applied to the switches S3, S4. The transmit controller 104 may also provide a signal to the voltage source 106 indicative of an output voltage which the voltage source 106 is to apply to the inverter 130.

In an example, the transmitter coil 126 may transmit the power signal based on the switching and magnetic flux of the power signal couples with a receiver coil 120 of the wireless power receiver 116 which is an inductor Ls to induce a voltage or current in the receiver coil 120 to transmit power from the wireless power transmitter 150 to the wireless power receiver 116. In an example, coil Ls, capacitor Cs, capacitor Cd, resistor Rc, and a rectifier (not shown) may form resonance circuitry of the wireless power receiver 116 to filter the induced current or voltage which is then provided to the electronic device 118. In an example, the transmitted power associated with the induced current or voltage may charge a battery of the electronic device or power the electronic device 118.

In some examples, a foreign object (i.e., FO) may be located on the charging surface 114. The foreign object may be a metal object such as a key, paper clip, or pen and be positioned in between the transmitter coil 126 and receiver coil 120 on the charging surface 114. Alternatively, the foreign object might be a component of the wireless receiver 116 such as a metal frame around the wireless receiver 116, referred to as a friendly FO. The FO may be introduced intentionally or inadvertently on the charging surface 114. The magnetic flux associated with the power signal transmitted by the wireless power transmitter 150 might produce eddy currents in the FO which in turn produces high temperatures in the foreign object and damage to one or more of the foreign object, charging surface 114, and the wireless power receiver.

To detect presence of the FO and reduce the heating, the transmit controller 104 may determine a difference between an amount of power that the wireless power transmitter transmits and an amount of power that the wireless power receiver 116 receives. This difference is referred to as a power loss.

The wireless power receiver 116 may have a receive controller 152. The transmit controller 104 and the receive controller 152 of the wireless power receiver 116 may facilitate determining the power loss. The transmit controller 104 may determine the amount of power that the wireless power transmitter 150 transmits as a power input into the wireless power transmitter 150 by the voltage source 106 minus a power loss across components of the wireless power transmitter 150 having an internal resistance. The receive controller 152 may determine the amount of power that the wireless power receiver 116 receives as a power output by the wireless power receiver 116 to the electronic device 118 plus a power loss across components of the wireless power receiver 116 having an internal resistance. The wireless power receiver 116 may communicate an indication of this received power to the wireless power transmitter 150. For example, the receive controller 152 may cause a received power packet (RPP) to be provided to the wireless power transmitter 150 by applying a voltage or current to the receiver coil 120 indicative of the received power which generates a magnetic flux which couples to the transmitter coil 126 and induces a current in the transmitter coil 126 indicative of the received power. A sensing circuit 122 of the wireless power transmitter 150 may then detect a voltage indicative of this induced current. The sensing circuit 122 may include current transformer T1 with inductors Lc1, Lc2 to detect the voltage, or other circuit such as an operational amplifier. The current in the transmitter coil 126 may be sensed by current transformer T1 and then induces a voltage across a load R. The voltage across the load R is provided to the transmit controller 104 having circuitry to measure a peak-to-peak voltage indicative of the coil current and communication information indicative of the received power by the wireless power receiver 116 over time. The transmit controller 104 may determine the power loss associated with wireless power transmission based on a difference between an amount of power of the power signal that the wireless power transmitter 150 transmits and an amount of power that the wireless power receiver 116 receives which is indicated by the RPP.

If there is no FO present on the charging surface, the power loss should be close to zero. But if a FO is present on the charging surface, the FO will absorb power of the transmitted signal and eddy currents may be generated in the FO. The eddy current may result in heat dissipation by the FO, power loss resulting from the heat dissipation, and heating of the FO.

In an example, the transmit controller 104 may have a foreign object detector (FOD) 154 to reduce excessive heating of a FO. The foreign object detector 154 may monitor the power loss and compare the power loss to a FOD threshold level. If the power loss associated with the wireless power transmission exceeds the FOD threshold level, then the wireless power transmitter 150 may stop transmitting the power signal. If the power loss associated with the wireless power transmission does not exceed the FOD threshold level, then the wireless power transmitter may continue to transmit the power signal.

In some examples, the foreign object detector affects charging performance. For example, if the FO is a friendly FO, a certain power loss results in triggering the FOD threshold level. Because a larger portion of the power loss is due to misalignment of a receiver coil and a transmitter coil on a charging surface, the FOD threshold level associated with the foreign object detector is increased so that the power signal is transmitted in presence of higher power loss to improve charging or increase active charging area. But this increase in the FOD threshold level may have a negative effect if the FO is not a friendly FO. The increase in the FOD threshold level might result in an excessive heating of the FO because the wireless power transmitter does not distinguish whether or not the FO is a friendly FO.

Embodiments disclosed herein are directed to the wireless power transmitter 150 controlling the power loss. The wireless power transmitter 150 may have a power loss controller 124 to control power loss instead of the foreign object detector 154 only comparing the power loss to a threshold level and stopping transmission of the power signal when the power loss exceeds the threshold level. The power loss controller 124 may adjust the transmitted power dynamically based on a closed loop such as a proportional integral (PI) control, proportional integral derivative (PID) control, or proportional control to regulate power loss in an acceptable range by keeping the power loss below the threshold level so that transmission of the power signal is not terminated and resulting heating of the FO is kept in an acceptable range. The use of the control loop balances charging performance with safety associated with wireless charging in presence of FO which include friendly FO.

Figure 2:
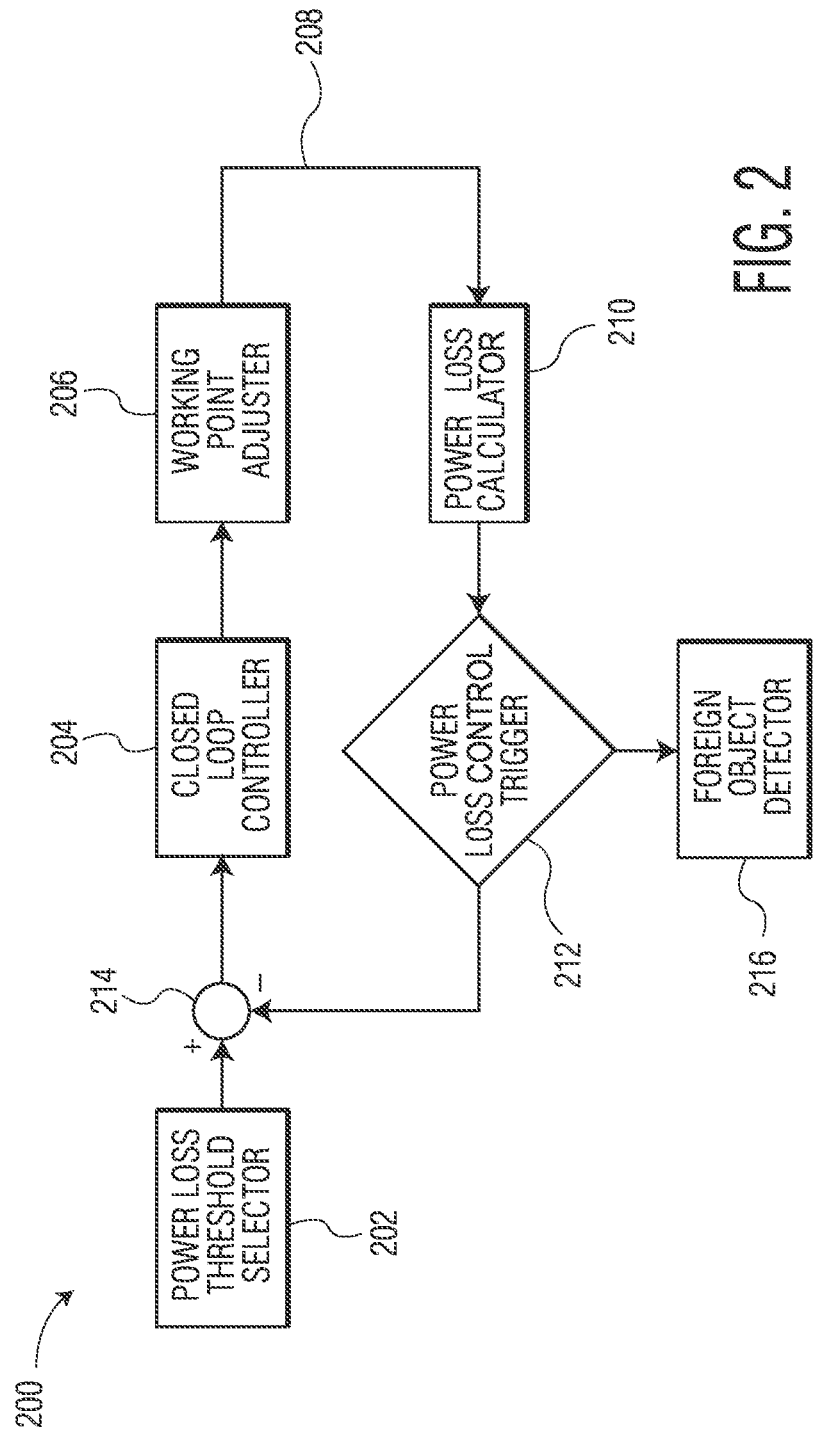
FIG. 2 illustrates an example control logic of a power loss controller of the wireless power transmission system to control power loss in accordance with an exemplary embodiment.

FIG. 2 illustrates an example control logic 200 of the power loss controller 124 to control power loss in accordance with an exemplary embodiment. The control logic 200 includes a power loss threshold selector 202, a comparator 214, a closed loop controller 204, a working point adjuster 206, a foreign object detector 216, and a feedback loop 208 which includes a power loss calculator 210 and a power loss control trigger 212.

Processing of the control logic 200 may begin with the power loss calculator 210 determining a power loss between the wireless power transmitter 150 and the wireless power receiver 116. The power loss may be a difference between the transmitted power and the received power. The power loss may be provided to the power loss trigger 212 which determines based on various criteria outlined below whether to execute closed loop power loss control. If the closed loop power loss control is not to be executed, then the foreign object detection 214 may be performed which involves comparing the power loss to a FOD threshold value and stopping transmission of the power signal if the power loss exceeds the FOD threshold value. If the closed loop power loss control is to be executed, then the comparator 214 may compare the power loss to a selected power loss limit. The power loss threshold selector 202 may define the selected power loss limit which is a power loss which is acceptable between the wireless power transmitter 150 and the wireless power receiver 116 and to which the closed loop power loss control converges. Closed loop power loss control may include functions of the closed loop controller 204 and working point adjuster 206. A difference (e.g., error) between the power loss and the selected power loss limit is provided to the closed loop controller 204 which outputs a target transmit power based on one of PI control, PID control, or proportional control in an example. The closed loop controller 204 may increase the target transmit power when the power loss is less than the selected power loss limit which indicates that it is safe to increase transmitted power and the closed loop controller 204 may decrease the target transmit power when the power loss is greater than the selected power loss limit. The working point adjuster 206 receives this target transmit power to cause the wireless power transmitter 150 to transmit the power signal at the target transmit power. For example, working point adjuster 206 may cause adjustment of one or more of the voltage output by the voltage source 106, a frequency of the PWM signal applied to the switches S1 to S4, and duty cycle of the PWM signal to transmit the power signal with the target transmit power.

EXAMPLE METHODS

Figure 3:
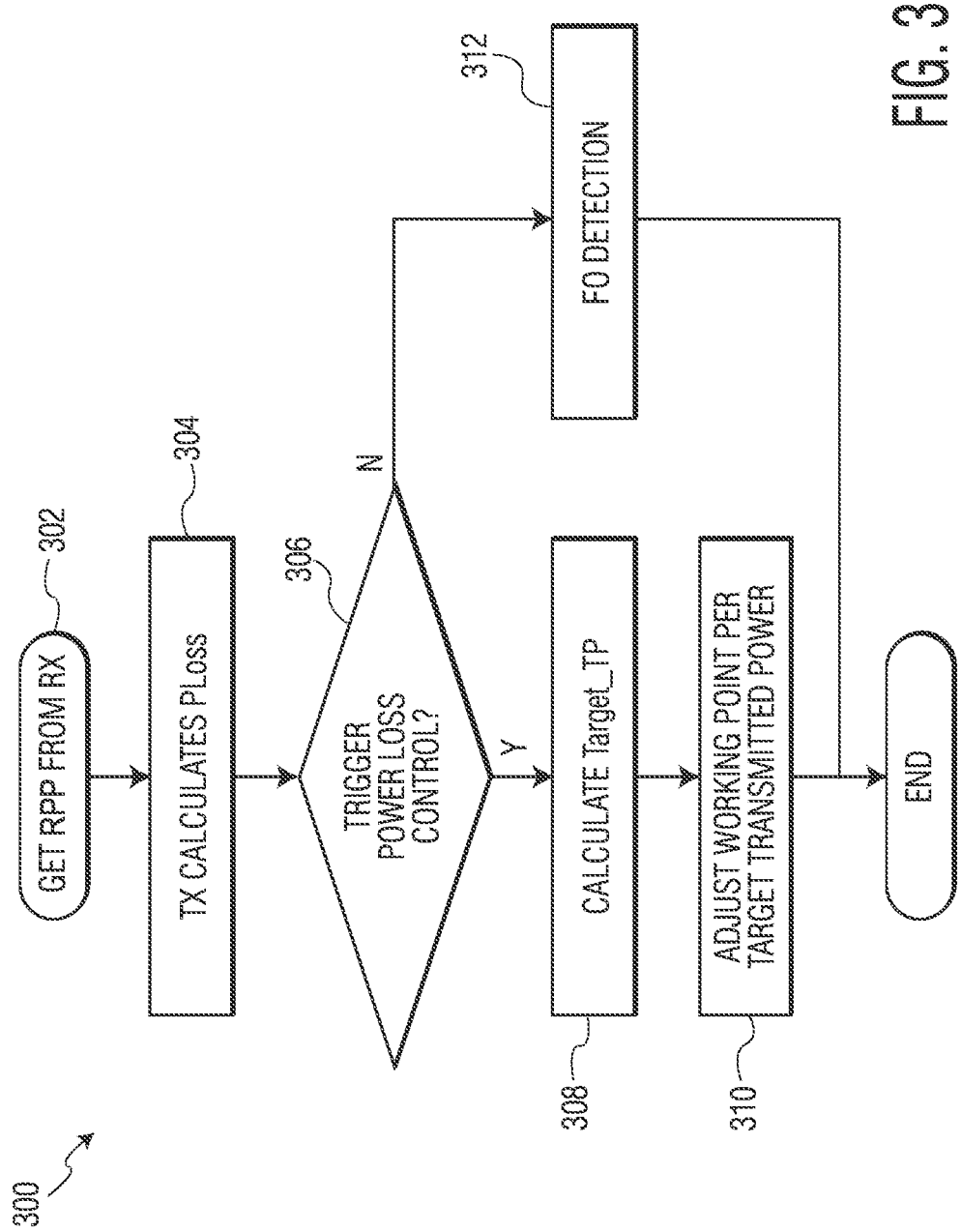
FIG. 3 is a flow chart of example functions to control power loss based on the control logic in accordance with an exemplary embodiment.

FIG. 3 is a flow chart 300 of example functions of the power loss control based on the control logic 200 accordance with an exemplary embodiment. In an example, the power loss controller 124 of the transmit controller 104 of the wireless power transmitter 150 may perform the functions 300 in accordance with the control logic 200.

The functions 300 of the wireless power transmission may begin at 302. At 302, the wireless power transmitter 150 may receive an indication from the wireless power receiver 116 of the received power. The indication may be the RPP from the wireless power receiver 116 in an example. At 304, the wireless power transmitter 150 may determine the power loss between the wireless power transmitter 150 transmitting the power signal and the wireless power receiver 120 receiving the power signal. The power loss may be the difference between the transmitted power determined by the transmit controller 104 and the received power indicated by the RPP. At 306, a check is made as described in more detail below whether to trigger the closed loop power loss control. If the power loss control is to be performed, then the closed loop controller 204 determines the target transmit power at 308 by determining an error between the power loss and the selected power loss limit indicated by the power loss threshold selector 202. The error may be positive or negative and the target transmit power may be based on the error. At 308, the closed loop controller 204 determines a target transmit power based on the error. In an example, the target transmit power may be set based on a target transmit power determined by the closed loop controller 204 in a previous iteration of the closed loop control so that a difference is less than predetermined criteria and there is no shortage of power to reach the target power. Then, the transmit controller 104 adjusts the transmitted power of the power signal transmitted by the wireless power transmitter 150 to meet the target transmission power at 310. If the power loss control is not to be performed, then FO detection is performed at 312 where the power loss is compared to an FOD threshold level which if exceeded results in the wireless power transmitter 150 stopping transmission of the power signal.

Figure 4:
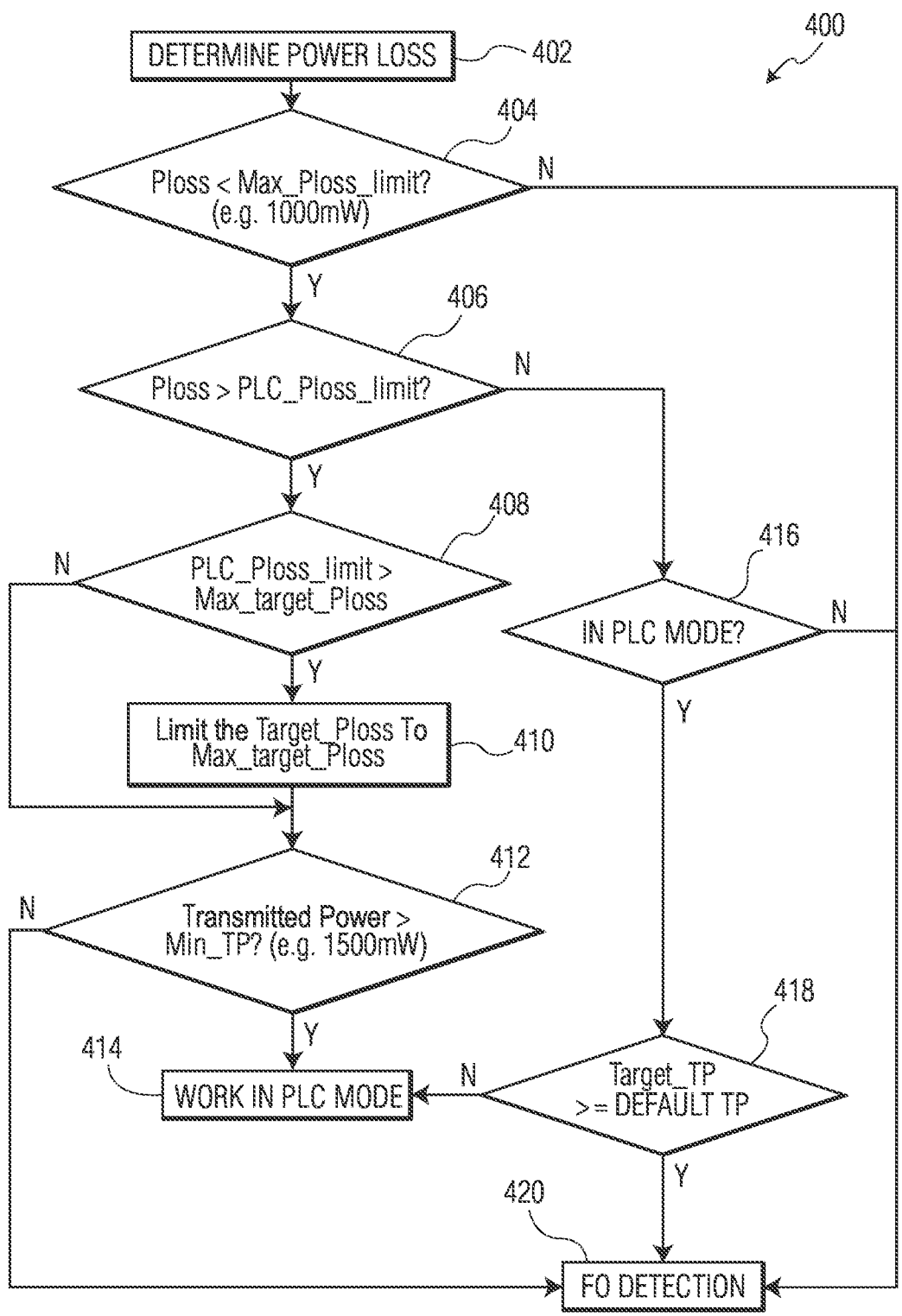
FIG. 4 is a flow chart of example functions associated with determining whether to apply a closed loop power loss control to control power loss in accordance with an exemplary embodiment.

FIG. 4 is a flow chart 400 of example functions associated with determining whether to apply a closed loop power loss control to control power loss in accordance with an exemplary embodiment. The functions 400 may be associated with steps 306, 308, 312 of FIG. 3. In an example, the power loss controller 124 of the transmit controller 104 of the wireless power transmitter 150 may perform the functions 400.

The determination of whether to perform the power loss control may begin at 402 where the transmit controller 104 determines the power loss associated with transmitting a power signal from the wireless power transmitter 150 to the wireless power receiver 116. At 404, a determination is made whether the power loss is less than a maximum power loss limit. The maximum power loss limit may be a FOD threshold level to indicate presence of a large FO. If the power loss is below the maximum power loss limit, then at 406, a determination is made whether the power loss is greater than a power loss control (PLC) power loss limit. The PLC power loss limit may be the FOD threshold level minus a margin and selectable by a user The PLC power loss limit acts as a limit for performing the closed loop power loss control. In some examples, the PLC power loss limit is the selected power loss limit. At 408, a determination is made whether the PLC power loss limit is greater than a maximum target power loss. Because the PLC power loss limit may be configurable by the user, PLC power loss limit may be compared to the maximum target power loss to prevent the user from setting the PLC power loss limit to be excessively high and creating a safety issue. If the PLC power loss limit is greater than a maximum target power loss, then at 410, the target power loss is limited to the maximum target power loss. If the PLC power loss limit is not greater than a maximum target power loss or the PLC power loss is limited to the maximum target power loss, then processing continues to 412 where the transmitted power is compared to a minimum threshold power (Min_TP). If the transmitted power is less than the minimum threshold power, then there is no margin for the wireless power transmitter 150 to adjust transmitted power since the wireless power transmitter 150 needs to keep a stable power transmission. The wireless power transmitter 150 may not perform the power loss control and instead performs FOD detection 420 in this case or step 312 of FIG. 3. If the transmitted power is not less than the minimum threshold power, then the wireless power transmitter 150 may perform the power loss control (PLC) at 414 or steps 308, 310 of FIG. 3. In an example, the wireless power transmitter 150 may have a state variable which indicates whether the closed loop power loss control is performed. The state variable may have a first value to indicate that closed loop power loss control is to be performed and a second value to indicate that closed loop power loss control is not to be performed. At 414, the state variable may be set to the first value. Returning back to 406, if the power loss is less than the PLC power loss limit, then at 416, a determination is made whether the state variable indicates that closed loop power loss control is to be performed. If the power loss is less than the PLC power loss limit and the state variable indicates that closed loop power loss control is to be performed, then at 418, a determination is made whether the target transmit power is greater than a default transmitted power. If the target transmit power is greater than a default transmitted power, then a risk of excessively heating a FO object is low because the power loss is low and the transmitted power is greater than the default transmitted power. The FO detection 420 is performed rather than the closed loop power loss control. The state variable which indicates whether closed loop power loss control is to be performed is set to the second value. Otherwise, the closed loop power loss control continues at 414. If the power loss is less than the PLC power loss limit and the state variable indicates that closed loop power loss control is not to be performed at 416 based on the state variable, then the wireless power transmitter 150 may not perform the closed loop power loss control and performs FO detection 420. Similarly, the state variable may be set to indicate that closed loop power loss control is not to be performed if the determination is made that the power loss is less than a maximum power loss limit at 404. The wireless power transmitter 150 may also then perform the FO detection 420.

In some examples, an amount of transmitted power that the wireless power receiver 116 needs to power the electronic device 120 or charge the battery of the electronic device 120 may be indicated by a control error packet (CEP) from the wireless power receiver 116. A positive CEP may indicate for the wireless power transmitter 150 to send more power than a transmitted power and a negative CEP packet may indicate for the wireless power transmitter 150 to reduce a transmitted power. In an example, the wireless power receiver 116 may determine whether more or less power should be sent by comparing a rectified voltage at the wireless power receiver 116 with a target voltage. In an example, the wireless power transmitter 150 adjusts the transmitted power according the target transmit power indicated by the closed loop controller 204 based on the indication of the CEP packet.

Figure 5:
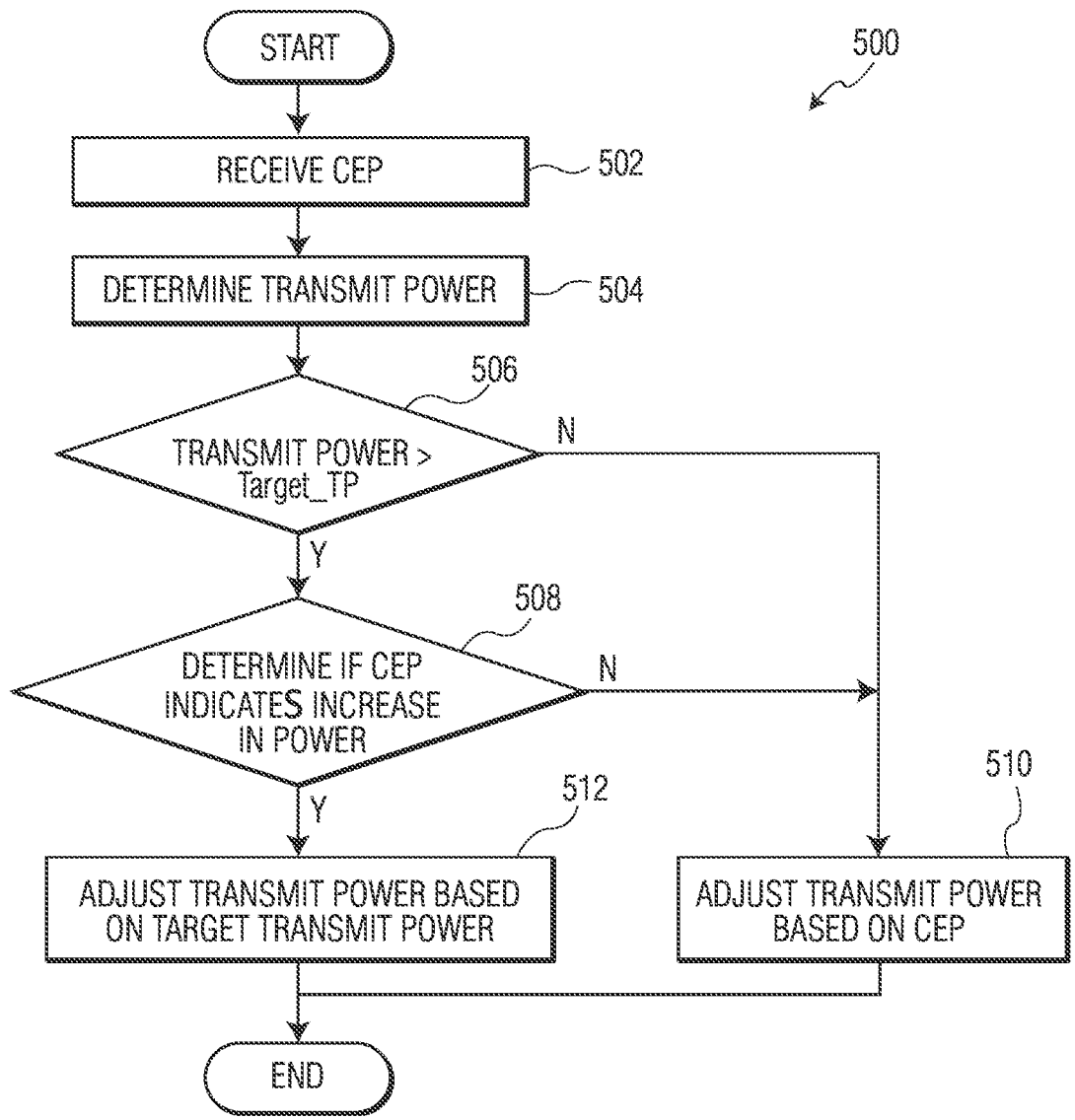
FIG. 5 is a flow chart of example functions for adjusting the transmitted power during the closed loop power loss control based on a control error packet received from a wireless power receiver in accordance with an exemplary embodiment.

FIG. 5 is a flow chart 500 of example functions for adjusting the transmitted power during the power loss control based on the CEP in accordance with an embodiment of the invention. In an example, the functions may be performed by the power loss controller 124 of the transmit controller 104.

At 502, a CEP is received from the wireless power receiver 116. At 504, a transmitted power of the wireless power transmitter 150 is determined by the power loss controller 124. The transmitted power may be based on a power input to the inverter 130 of the wireless power transmitter 150 and a power loss across the components of the inverter 130 of the wireless power transmitter 150. At 506, the transmitted power is compared to a target transmit power output by the closed loop controller 204. If the transmitted power is less than the target transmit power, then at 510, transmit power of the wireless power transmitter is adjusted by the working point adjuster 206 based on the CEP because an adjustment in transmitted power is needed and any adjustment in transmitted power indicated by the CEP will adjust transmit power. If the transmitted power is greater than the target transmit power, then at 508, a determination is made whether the CEP indicates an increase in power. If the CEP indicates an increase in the power is needed, then at 512, the CEP is ignored and the transmitted power of the wireless power transmitter 150 is adjusted by the working point adjuster 206 based on the target transmit power to reduce the transmitted power. Further, if the CEP does not indicate an increase in power at 508, then the transmitted power of the wireless power transmitter 150 is adjusted by the working point adjuster 206 based on the CEP because the transmitted power is greater than the target transmit power and the CEP indicates to reduce the transmitted power. In an example, the working point adjuster 206 receives the target transmit power to cause the wireless power transmitter 150 to transmit the power signal at the target transmit power or receives the CEP to cause the wireless power transmitter 150 to transmit the power signal in accordance with CEP. For example, working point adjuster 206 may cause adjustment of one or more of the voltage output by the voltage source 106, a frequency of the PWM signal applied to the switches S1 to S4, and duty cycle of the PWM signal to transmit the power signal with the desired power.

Figure 6:
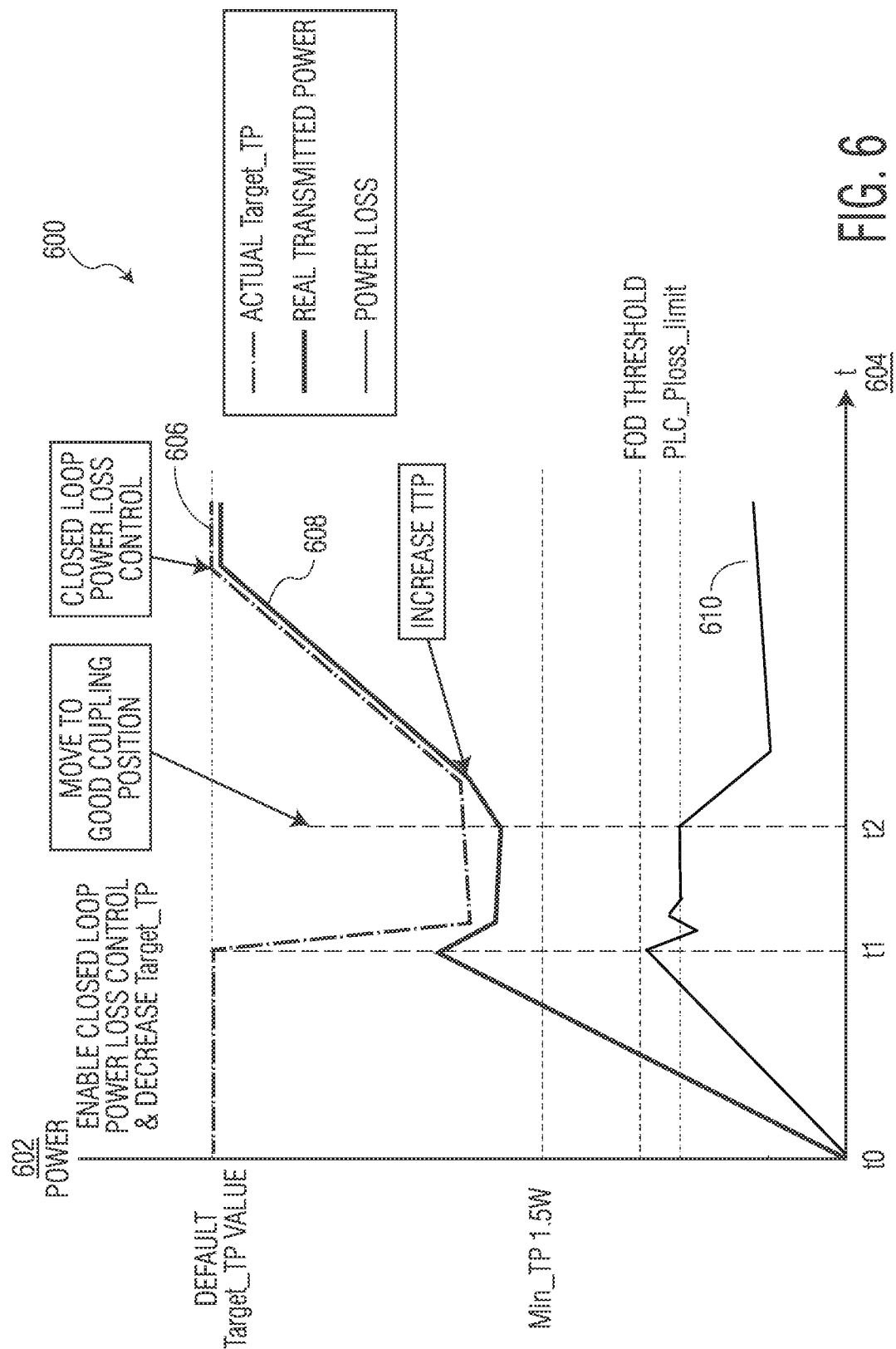
FIG. 6 illustrates an example plot illustrating controlling power loss in presence of a foreign object in accordance with an exemplary embodiment.

FIG. 6 illustrates an example plot 600 illustrating operation of the wireless power transmitter 150 in the presence of a FO in accordance with an embodiment. The wireless power transmitter may transmit the power signal in presence of the friendly FO based on the power loss control rather than stopping transmission of the power signal in presence of the FO.

The plot 600 illustrates power on axis 602 versus time on axis 604. Various power levels on the axis 602 is also illustrated associated with determining whether to perform the power loss control including the default target transmit power, the minimum transmitted power, the FOD threshold level, and the power loss control (PLC) power loss limit as described above.

In the plot 600, the wireless power receiver 116 may be placed on the charging pad 114 at time to. The plot 600 shows multiple curves as a result of transmitting power to the wireless receiver 116 including curve 606 which illustrates a target transmit power as a function of time, curve 608 which illustrates a transmitted power of the wireless power transmitter 150 as a function of time, and curve 610 which illustrates a power loss as a function of time. As a result of placing the wireless receiver 116 on the charging pad 114 at $t_0$, the transmitted power may increase over time and the power loss also increases over time. At $t_1$, the power loss may exceed the power loss control power loss limit and the wireless power transmitter 150 may operate in closed loop power loss control by adjusting the target transmit power. The target transmit power may decrease and the power loss may also decrease in this case below the power loss control power loss limit. In an example, the FO on the charging pad 114 may be a friendly FO such as a metal frame around the wireless receiver 116. At $t_2$, the wireless power receiver 116 may be moved to improve alignment of the transmitter coil 120 and the receiver coil 116 in presence of the friendly FO. As a result, power loss continues to decrease and the wireless power transmitter 150 increases the target transmit power. When the target transmit power reaches the default target transmit power, the wireless power transmitter 150 may exit the closed loop power loss control.

In one embodiment, a method for power transmission by a wireless power transmitter to wirelessly charge a battery of an electronic device or power the electronic device is disclosed. The method comprises: determining a power loss associated with transmitting a power signal having a transmitted power from the wireless power transmitter to a wireless power receiver; performing a closed loop power loss control based on the power loss which comprises outputting a target transmit power to meet a power loss limit; and wirelessly transmitting the power signal having the target transmit power to the wireless power receiver to charge the battery of the electronic device or power the electronic device. In an example, the closed loop power loss control includes one of a proportional integral derivative control, proportional integral control, and proportional control. In an example, the method further comprises comparing the power loss to a maximum power loss and stopping transmission of the power signal based on the power loss exceeding a foreign object detection threshold. In an example, the method further comprises comparing the power loss to a power loss control power loss limit and performing the closed loop power loss control based on the power loss exceeding the power loss control power loss limit. In an example, the method further comprises comparing the transmitted power of the power signal to a minimum transmitted power and performing the closed loop power loss control based on the transmitted power loss exceeding the minimum transmitted power. In an example, the method further comprises determining that the target transmit power is greater than a default transmitted power and responsively stopping the closed loop power loss control. In an example, the method further comprises comparing the power loss to a foreign object detection threshold and stopping transmission of the power signal when the power loss exceeds the foreign object detection threshold. In an example, causing the wireless power transmitter to transmit the power signal at the target transmit power is based on an indication by the wireless power receiver to adjust the transmitted power of the power signal. In an example, the indication is ignored when the transmitted power is greater than the target transmit power and the indication is to increase the transmitted power. In an example, the indication is specified in a control error packet (CEP) received from the wireless power receiver.

In another embodiment, a wireless power transmitter to wirelessly charge a battery of an electronic device or power the electronic device is disclosed. The wireless power transmitter comprises: a power loss controller which comprises a power loss calculator, a closed loop power loss controller, and a working point adjuster; wherein the power loss calculator is arranged to determine a power loss associated with transmitting a power signal having a transmitted power between the wireless power transmitter and a wireless power receiver; wherein the closed loop power loss controller is arranged to perform a closed loop power loss control based on the power loss which comprises outputting a target transmit power to meet a power loss limit; and wherein the working point adjuster is arranged to cause the wireless power transmitter to wirelessly transmit the power signal having the target transmit power to the wireless power receiver to charge the battery of the electronic device or power the electronic device. In an example, the closed loop power loss control includes one of a proportional integral derivative control, proportional integral control, and proportional control. In an example, the wireless power transmitter further comprises the power loss controller arranged to compare the power loss to a maximum power loss and stopping transmission of the power signal based on the power loss exceeding a foreign object detection threshold. In an example, the wireless power transmitter further comprises the power loss controller arranged to compare the power loss to a power loss control power loss limit and performing the closed loop power loss control based on the power loss exceeding the power loss control power loss limit. In an example, the wireless power transmitter further comprises the power loss controller arranged to compare the transmitted power of the power signal to a minimum transmitted power and performing the closed loop power loss control based on the transmitted power loss exceeding the minimum transmitted power. In an example, the wireless power transmitter further comprises the power loss controller arranged to determine that the target transmit power is greater than a default transmitted power and stopping the closed loop power loss control of the transmitted power. In an example, the wireless power transmitter further comprises the power loss controller arranged to compare the power loss to a foreign object detection threshold and stopping transmission of the power signal when the power loss exceeds the foreign object detection threshold. In an example, the power loss controller arranged to cause the wireless power transmitter to transmit the power signal at the target transmit power is based on an indication by the wireless power receiver to adjust the transmitted power of the power signal. In an example, the indication is ignored when the transmitted power is greater than the target transmit power and the indication is to increase the transmitted power.

In yet another embodiment, a system to wirelessly charge a battery of an electronic device or power the electronic device is disclosed. The system comprises: a wireless power transmitter arranged with a transmit coil; a wireless power receiver arranged with a receiver coil; a charging surface on which the transmit coil of wireless power transmitter and the receive coil of the wireless power receiver are located; and wherein the wireless power transmitter is arranged to determine a power loss associated with transmitting a power signal having a transmitted power from the wireless power transmitter to the wireless power receiver; perform a closed loop power loss control based on the power loss which comprises outputting a target transmit power to meet a power loss limit; and wirelessly transmit the power signal having the target transmit power to the wireless power receiver to charge the battery of the electronic device or power the electronic device.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method for power transmission performed by a wireless power transmitter to wirelessly charge a battery of an electronic device or power the electronic device, the method comprising:
   determining a transmit power of the wireless power transmitter;
   calculating a power loss associated with transmitting a power signal from the wireless power transmitter to a wireless power receiver, the power loss being a difference between the transmit power and a receive power, the receive power being a power of the power signal received at the receiver;
   performing a closed loop power loss control based on the power loss which comprises outputting a target transmit power to meet a power loss limit, wherein closed loop power loss control is further performed based on the transmit power being greater than a minimum threshold power, the power loss being greater than a power loss control limit, and the power loss being less than a foreign object detection threshold;
   wirelessly transmitting the power signal having the target transmit power to the wireless power receiver to charge the battery of the electronic device or power the electronic device;
   comparing the power loss to the foreign object detection threshold;
   stopping the closed loop power control and continuing to transmit the power signal when the transmit power is less than the minimum threshold power and the power loss is less than the foreign object detection threshold; and
   stopping transmission of the power signal when the power loss exceeds the foreign object detection threshold.

2. The method of claim 1, wherein the closed loop power loss control includes one of a proportional integral derivative control, proportional integral control, and proportional control.

3. The method of claim 1, further comprising comparing the power loss to a power loss control power loss limit and performing the closed loop power loss control based on the power loss exceeding the power loss control power loss limit.

4. The method of claim 3, further comprising comparing the transmitted power of the power signal to the minimum threshold power and performing the closed loop power loss control based on the transmitted power exceeding the minimum threshold power.

5. The method of claim 1, further comprising determining that the target transmit power is greater than a default transmitted power and the power loss is less than the power loss control power loss limit and responsively stopping the closed loop power loss control.

6. The method of claim 1, wherein causing the wireless power transmitter to transmit the power signal at the target transmit power is based on an indication by the wireless power receiver to adjust the transmitted power of the power signal.

7. The method of claim 6, wherein the indication is ignored when the transmitted power is greater than the target transmit power and the indication is to increase the transmitted power.

8. The method of claim 6, wherein the indication is specified in a control error packet (CEP) received from the wireless power receiver.

9. A wireless power transmitter to wirelessly charge a battery of an electronic device or power the electronic device, the wireless power transmitter comprising:
   a power loss controller which comprises a power loss calculator, a closed loop power loss controller, a foreign object detector, and a working point adjuster;
   wherein the power loss calculator is arranged to determine a transmit power of the wireless power transmitter; calculate a power loss associated with transmitting a power signal between the wireless power transmitter and a wireless power receiver, the power loss being a difference between the transmit power and a receive power, the receive power being a power of the power signal received at the receiver;
   wherein the closed loop power loss controller is arranged to perform a closed loop power loss control based on the power loss being less than a foreign object detection threshold, the power loss being greater than a power loss control limit, and the transmitted power being greater than a minimum threshold power, the closed loop power control comprising outputting a target transmit power to meet a power loss limit;
   wherein the working point adjuster is arranged to cause the wireless power transmitter to wirelessly transmit the power signal having the target transmit power to the wireless power receiver to charge the battery of the electronic device or power the electronic device; and
   wherein the foreign object detector is arranged to stop transmission of the power signal when the power loss exceeds the foreign object detection threshold; and
   wherein the wireless power transmitter is further arranged to stop the closed loop power control and continue to transmit the power signal when the transmit power is less than the minimum threshold power and the power loss is less than the foreign object detection threshold.

10. The wireless power transmitter of claim 9, wherein the closed loop power loss control includes one of a proportional integral derivative control, proportional integral control, and proportional control.

11. The wireless power transmitter of claim 9, further comprising the power loss controller arranged to compare the power loss to a power loss control power loss limit and performing the closed loop power loss control based on the power loss exceeding the power loss control power loss limit.

12. The wireless power transmitter of claim 11, further comprising the power loss controller arranged to compare the transmitted power of the power signal to the minimum threshold power and performing the closed loop power loss control based on the transmitted power exceeding the minimum threshold power.

13. The wireless power transmitter of claim 9, further comprising the power loss controller arranged to determine that the target transmit power is greater than a default transmitted power and the power loss is less than the power loss control power loss limit and responsively stopping the closed loop power loss control of the transmitted power.

14. The wireless power transmitter of claim 9, wherein the power loss controller arranged to cause the wireless power transmitter to transmit the power signal at the target transmit power based on an indication by the wireless power receiver to adjust the transmitted power of the power signal.

15. The wireless power transmitter of claim 14, wherein the indication is ignored when the transmitted power is greater than the target transmit power and the indication is to increase the transmitted power.

16. A system to wirelessly charge a battery of an electronic device or power the electronic device, the system comprising:
   a wireless power transmitter arranged with a transmit coil;
   a wireless power receiver arranged with a receiver coil;
   a charging surface on which the transmit coil of wireless power transmitter and the receive coil of the wireless power receiver are located; and
   wherein the wireless power transmitter is arranged to determine a transmit power of the wireless power transmitter; calculate a power loss associated with transmitting a power signal from the wireless power transmitter to the wireless power receiver, the power loss being a difference between the transmit power and a receive power, the receive power being a power of the power signal received at the receiver; perform a closed loop power loss control based on the power loss which comprises outputting a target transmit power to meet a power loss limit, wherein closed loop power loss control is further performed based on the power loss being less than a foreign object detection threshold, the transmit power being greater than a minimum threshold power and the power loss is greater than a power loss control limit; and wirelessly transmit the power signal having the target transmit power to the wireless power receiver to charge the battery of the electronic device or power the electronic device; compare the power loss to a foreign object detection threshold based on the power loss being greater than or equal to the power loss limit; stop the closed loop power control and continue to transmit the power signal when the transmit power is less than the minimum threshold power and the power loss is less than the foreign object detection threshold; and stop transmission of the power signal when the power loss exceeds the foreign object detection threshold.

* * * * *